US011965145B2

(12) United States Patent
Purdy et al.

(10) Patent No.: US 11,965,145 B2
(45) Date of Patent: Apr. 23, 2024

(54) HARD SURFACE CLEANER

(71) Applicant: Fluid Energy Group Ltd., Calgary (CA)

(72) Inventors: Clay Purdy, Medicine Hat (CA); Markus Weissenberger, Calgary (CA); Kyle G. Wynnyk, Calgary (CA); Karl W. Dawson, Calgary (CA)

(73) Assignee: FLUID ENERGY GROUP LTD, Calgary (CA)

( * ) Notice: Subject to any disclaimer, the term of this patent is extended or adjusted under 35 U.S.C. 154(b) by 350 days.

(21) Appl. No.: 17/220,644

(22) Filed: Apr. 1, 2021

(65) Prior Publication Data

US 2021/0309935 A1    Oct. 7, 2021

(30) Foreign Application Priority Data

Apr. 3, 2020    (CA) .................................. CA 3077837

(51) Int. Cl.
| | |
|---|---|
| *C11D 1/00* | (2006.01) |
| *C11D 1/10* | (2006.01) |
| *C11D 1/14* | (2006.01) |
| *C11D 3/30* | (2006.01) |
| *C11D 3/39* | (2006.01) |
| *C11D 11/00* | (2006.01) |
| *C11D 17/00* | (2006.01) |

(52) U.S. Cl.
CPC .................. *C11D 1/14* (2013.01); *C11D 1/10* (2013.01); *C11D 3/30* (2013.01); *C11D 3/3947* (2013.01); *C11D 11/0023* (2013.01); *C11D 17/0008* (2013.01)

(58) Field of Classification Search
CPC ....................................................... C11D 1/10
See application file for complete search history.

(56) References Cited

U.S. PATENT DOCUMENTS

| | | | |
|---|---|---|---|
| 4,690,779 | A | 9/1987 | Baker et al. |
| 5,252,245 | A | 10/1993 | Garabedian et al. |
| 5,437,807 | A | 8/1995 | Garabedian, Jr. et al. |
| 5,468,423 | A | 11/1995 | Garabedian, Jr. et al. |
| 5,585,342 | A | 12/1996 | Choy et al. |

FOREIGN PATENT DOCUMENTS

| | | | | |
|---|---|---|---|---|
| CN | 109898085 A | * | 6/2019 | |
| EP | 0393772 A2 | | 10/1990 | |
| EP | 0428816 A1 | | 5/1991 | |
| GB | 2160887 B | | 11/1987 | |
| JP | 6603259 B2 | * | 11/2019 | ............. A01N 31/02 |

* cited by examiner

*Primary Examiner* — Necholus Ogden, Jr.
(74) *Attorney, Agent, or Firm* — Berg Hill Greenleaf Ruscitti LLP

(57) ABSTRACT

A composition is provided for use as a hard surface cleaner, sanitizer and/or disinfectant. In a preferred embodiment, the composition comprises an alkanesulfonic acid; a source of peroxide; an effective amount of a stabilizer; and water.

17 Claims, No Drawings

HARD SURFACE CLEANER

FIELD OF THE INVENTION

The invention is for a hard surface cleaner, sanitizer and/or disinfectant specifically adapted for use on non-porous hard surfaces, more specifically, to aqueous acidic compositions used as a hard surface cleaner, sanitizer and/or disinfectant.

BACKGROUND OF THE INVENTION

Microorganisms such as bacteria, fungi, viruses, or algae are present in every single environment inhabited by humans. While microorganisms are frequently an essential part of ecological systems; industrial processes; and human bodily functions, such as digestion, some microorganisms are highly undesirable. They may be the source of widespread illness, disease and even death for animals as well as humans.

In times of pandemics, there is an increased need for cleaning, sanitizing, and/or disinfecting for domestic and industrial settings as establishments, health care facilities and food supply chains. To prevent the spread of microorganisms, viruses, and pathogens, surfaces must be cleaned, sanitized and/or disinfected. The type and prevalence of microorganisms present depends on a number of factors, among which are: the availability of nutrients and moisture; humidity levels; temperature; human exposure levels, and surface roughness. Certain microorganism bacteria are capable of remaining viable in a dormant state on floors, tables, cabinets, handles or on other objects for extended periods of time until they are deposited or transferred to the proper media for growth.

Nutrients for microorganisms are typically abundant. For example, dried skin, discarded food, plants, animal wastes, synthetic and natural materials like: plastic coatings and objects, wood, paper, and natural fibers are all excellent nutrient media for many types of microorganisms, including potentially damaging organisms.

A major challenge within the health care field and now public and private spaces in general, is the prevention of the spread of dangerous infectious diseases by microorganisms and the associated human transmission. Facilities such as hospitals, office spaces, restaurants, gyms, nightclubs and long-term care facilities can become dangerous incubators of diseases. With regards to healthcare facilities the risk is exponentially higher, as many of the patients are in a weakened condition due to illness. In many cases, a microorganism that would not be a major threat to an overall healthy person can be fatal to someone with a compromised immune system or simply very elderly. Potentially dangerous microorganisms are deposited in health care facilities and elsewhere by a variety of means and tend to settle on many commonly contacted surfaces, including wheelchairs, ramps, door handles, food trays, washrooms, desks etc. Effective and thorough cleaning, sanitization and disinfection of all types of hard surfaces, such as the previously mentioned items, with appropriate compositions assists in slowing the growth or substantially containing the spread risks of such microorganisms.

Quaternary ammonium-based liquid hard surface cleaners are commonly used, typically as bathroom cleaners. Certain quaternary ammonium compounds can be effective antimicrobial agents in small dosages in these cleaners. However, quaternary ammonium compounds are lung irritants and can contribute to asthma and other breathing problems. They are also known as skin irritants, where their use may lead to unsightly rashes. Some recent data seems to indicate that exposure to quaternary ammonium compounds harms sperm quality, reduces fertility and results in birth defects in mice. Moreover, as the presence of the quaternary ammonium compounds lingers on surfaces treated with such cleaning compounds for long periods of time, it is thought that this is a factor in the emergence of viruses which are resistant to these compounds. Since such compounds linger for a period of time after application, even after wiping off, it is not recommended to use these types of compounds in and around food preparation areas or food handling areas, schools or health care facilities. Hence, both residential and commercial kitchens as well as food processing plants should avoid the presence and use of quaternary ammonium compounds. It is common to cycle quat based systems so as not to allow of resistance by germs to be gained, although many facilities do not adhere to this practice. It would be beneficial to utilized sanitization chemistry that does not promote such resistance by common germs and that has no major negative side effects such as those listed above.

Baker et al., U.S. Pat. No. 4,690,779, demonstrated a hard surface cleaner having improved non-streaking/filming properties in which a combination of low molecular weight polymer (e.g., polyethylene glycol) and certain surfactants were combined.

Corn et al., E.P. 0393772 and E.P. 0428816, describe hard surface cleaners containing anionic surfactants with ammonium counterions, and additional adjuncts.

G.B. 2,160,887 describes a cleaning system in which a combination of nonionic and anionic surfactants (including an alkanolamine salt alkyl sulfate) is contended to enhance cleaning efficacy.

U.S. Pat. No. 5,252,245, U.S. Pat. No. 5,437,807, U.S. Pat. No. 5,468,423, and U.S. Pat. No. 5,585,342, disclose improved glass and surface cleaners which combine either amphoteric or nonionic surfactants with solvents and effective buffers to provide excellent streaking/filming characteristics on glass and other smooth, glossy surfaces but which lack the presence of bactericides, such as quaternary ammonium compounds.

In food processing and handling there are several types of microbes, bacteria or other microorganisms with which food may come into contact. Much research has been done on such bacteria and the following provides a lower pH limit which still allows for microbial growth for the specific type of bacteria: *Clostridium perfringens* (min. pH for growth: 5.5-5.8); *Vibrio vulnificus* (min. pH for growth: 5); *Bacillus cereus* (min. pH for growth: 4.9); *Campylobacter* spp. (min. pH for growth: 4.9); *Shigella* spp. (min. pH for growth: 4.9); *Vibrio parahaemolyticus* (min. pH for growth: 4.8); *Clostridium botulinum toxin* (min. pH for growth: 4.6); *Clostridium botulinum growth* (min. pH for growth: 4.6); *Staphylococcus aureus growth* (min. pH for growth: 4); *Staphylococcus aureus toxin* (min. pH for growth: 4.5); *Enterohemorrhagic Escherichia coli* (min. pH for growth: 4.4); *Listeria monocytogenes* (min. pH for growth: 4.39); *Salmonella* spp (min. pH for growth: 4.21); and *Yersinia enterocolitica* (min. pH for growth: 4.2).

Mildly acidic cleaners are used to dissolve hard water deposits, remove mild rust stains, and eliminate soap film from common washroom and cooking/cleaning areas. They are useful in removing tarnish from brass and copper. Vinegar (acetic acid) and lemon juice (citric acid) are two of the most common mild acids found in cleaning compositions. Compositions made from those weak acids are generally safe for human and animal exposure. Other, harsher acids are also often found in common household cleaning products. Commercially common acids such as vinegar remove hard water deposits from glassware, rust stains from sinks, and tarnish from brass and copper. Citric acid is a natural substance found in lemons, limes, oranges, and grapefruits. It is nontoxic, antibacterial, and antiseptic. In general, its applications mirror those of vinegar. Some commercial products containing citric acid are water-based and may cause corrosion or rust on metals. It is therefore preferably to wash and dry the metal after cleaning to prevent the formation of rust. Phosphoric acid is mild, but more acidic than vinegar or lemon juice. Generally employed for rust removal, it is generally restricted to bathroom cleaners. Commercial products employing phosphoric acid include: tub, tile, sink, and toilet bowl cleaners.

Generally, strong acidic cleaners are considered toxic. They may as well be corrosive to the surfaces on which they are applied, meaning they can dissolve metal surfaces or damage human tissue (such as eyes and skin). Their use requires personal protective equipment (gloves, safety glasses, etc.) and careful application to avoid damaging materials other than those which require cleaning. Common acids that are considered strong acids are hydrochloric acid and sulfuric acid. Hydrochloric acid is found in some toilet bowl cleaners to remove scale deposition and general grime. It is highly corrosive to metals and dermal tissue. In commercial products, hydrochloric acid can be utilized to clean or etch concrete by consuming the top layer of concrete and or creating a porous surface for optimal coating or paint adhesion. Sulfuric acid is also utilized as an effective drain cleaner and can also be found in some toilet bowl cleaners. It is also considered a powerful oxidizer. These common mineral acids are now beginning to be banned for sale to the public in some jurisdictions, such as Europe, where they are utilized as a weapon by throwing in peoples faces or in some cases as components utilized in chemical weapons or explosives.

Another acid which may be mistakenly considered a strong mineral acid is hydrofluoric acid (used as a commercial rust remover, glass etch or aluminum polisher) has many negatives such as it will cause severe dermal burns, is highly toxic, is easily absorbed through the skin and fatal in some cases of even small exposure events. One must also take care to avoid exposing glass windows or glass products, which will be etched or dissolved. Oxalic acid is a bleaching agent used to remove rust. It is, however, quite toxic if it is inhaled or swallowed, and corrosive. It can also be unknowingly ingested indirectly if the surfaces cleaned (i.e., utensils, bowls, plates, etc.) come into contact with food destined for consumption.

Other compounds such as sodium bisulfate (found in some toilet bowl cleaners) is a poison and requires extreme caution; and sodium hypochlorite (found in some in bleaching solutions, disinfectants, water purifiers, and cleaning products). Sodium hypochlorite when used as a disinfectant destroys bacteria, viruses, and mold. Breathing or ingesting this compound may cause poisoning In light of the prior art and limits for microbial growth for a number of extremely problematic bacteria, the inventors have devised a novel approach for the cleaning of hard surfaces all the while minimizing the use of chemicals such as quaternary amines and bleach, both of which are very harmful for long term human exposure.

Hydrogen peroxide has been used as an antiseptic since the 1920s because it kills bacteria cells by destroying their cell walls. It does so through the process of oxidation. Unfortunately, peroxides as a group are not stable molecules.

In order to clean surfaces from the possible presence of viruses, the U.S. Centers for Disease Control and Prevention (the CDC) recommends first cleaning surfaces with soap and water, and then disinfecting them with EPA-registered household disinfectants which include: diluted bleach (the CDC recommends one part bleach to 50 parts water, while the Public Health Agency of Canada recommends one part bleach to nine parts water); and solutions containing at least 70 per cent alcohol. The two-step approach may work for some, but can also cause problems for others and is much more difficult to apply in an industrial (manufacturing, food processing, dairy's, breweries, warehouses or abattoirs for example) setting.

In light of the above, there still exists a need for an improved composition for cleaning and sanitizing hard surfaces which is cost effective and carries little or no future impact on the environment and/or on the possibility of microorganism adaptation or immunity. The present invention addresses the drawbacks of the prior art by providing an effective surface cleaning composition which combines a low pH with an oxidizing agent to ensure a substantially complete destruction of bacteria on a hard surface without resorting to alcohol-based solution.

SUMMARY OF THE INVENTION

According to an aspect of the present invention, there is provided an aqueous, antimicrobial hard surface cleaning composition, said composition comprising:
an alkanesulfonic acid;
a source of peroxide;
an effective amount of a stabilizer; and
water.

According to an object of the present invention, there is provided a method to improve microorganism contaminant removal from hard surfaces. According to a preferred embodiment, the microorganism contaminant being removed is selected from the group consisting of: viruses, bacteria, fungi and microbes.

According to a preferred embodiment of the present invention, there is disclosed a method of cleaning and disinfecting a hard surface by applying a preferred composition to a contaminated surface and removing both from said surface.

Accordingly, there is a need, both in industry and in the home, for a safe and effective microbiocidal cleaner, sanitizer and/or disinfectant that can be used on a wide variety of surfaces.

According to a preferred embodiment of the present invention, there is provided a microbiocidal cleanser or disinfectant that will kill or inhibit a wide variety of microorganisms.

According to a preferred embodiment of the present invention. there is provided a microbiocidal cleaner, sanitizer and/or disinfectant that is safe for use around humans and animals.

It is an object of the present invention to provide a hard surface cleaner which does not exhibit long term latency as is found with quaternary ammonium compounds.

According to an object of the present invention, there is provided a composition for use as a hard surface cleaner, disinfectant and/or sanitizer, said composition comprising:
an alkanesulfonic acid;
a source of peroxide;

an effective amount of a stabilizer; and
water.

Preferably, the alkanesulfonic acid is present in an amount ranging from 0.5 to 5 w/w % of the total weight of the composition.

Preferably, said source of peroxide is present in an amount ranging from 0.5 to 10 w/w % of the total weight of the composition. More preferably, said source of peroxide is present in an amount ranging from 0.5 to 7.5 w/w % of the total weight of the composition. Even more preferably, said source of peroxide is present in an amount ranging from 0.5 to 5 w/w % of the total weight of the composition.

Preferably also, said stabilizer is present in an amount ranging from 0.05 to 5 w/w % of the total weight of the composition. More preferably, said stabilizer is present in an amount ranging from 0.05 to 3 w/w % of the total weight of the composition. Even more preferably, said stabilizer is present in an amount ranging from 0.05 to 2 w/w % of the total weight of the composition. According to a preferred embodiment of the present invention, the stabilizer is present in an amount ranging from 0.05 to 1 w/w % of the total weight of the composition.

Preferably, said alkanesulfonic acid is selected from the group consisting of: alkanesulfonic acids where the alkyl groups range from C1-C6 and are linear or branched; and combinations thereof. Preferably, said alkanesulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkanesulfonic acid is methanesulfonic acid. Also preferably, said alkanesulfonic acid has a molecular weight below 300 g/mol. Also preferably, said alkanesulfonic acid has a molecular weight below 150 g/mol.

According to a preferred embodiment of the present invention, the source of peroxide is selected from the group consisting of: hydrogen peroxide; benzoyl peroxide; percarbonates; perborates; persulfates; and combinations thereof. Preferably, the peroxide is hydrogen peroxide.

According to a preferred embodiment of the present invention, the stabilizer is an alkanolamine. Preferably, the alkanolamine is selected from the group consisting of: monoethanolamine; diethanolamine; triethanolamine; and combinations thereof More preferably, the alkanolamine is monoethanolamine. According to another preferred embodiment of the present invention, the alkanolamine is diethanolamine. According to yet another preferred embodiment of the present invention, the alkanolamine is triethanolamine.

According to a preferred embodiment of the present invention, the stabilizer is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of C1-C5 linear alkyl and C1-C5 branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

According to a preferred embodiment of the present invention, the composition has a pH of less than 3. Preferably, the composition has a pH of less than 2. Even more preferably, the composition has a pH of less than 1.5, more preferably, the pH is close to 1. Even more preferably, the composition has a pH of less than 1.0. In that respect, in some instances, the pH can reach close to 0.5.

According to an object of the present invention, there is provided a method of cleaning a hard surface, wherein said method comprises the steps of:
providing a composition according to the above;
providing a surface which requires cleaning; and applying the composition onto said surface for a duration of time sufficiently long enough to destroy microorganisms present on said surface.

According to another object of the present invention, there is provided a method of disinfecting a hard surface, wherein said method comprises the steps of:
providing a composition according to the above;
providing a surface which requires disinfecting; and
applying the composition onto said surface for a duration of time sufficiently long enough to destroy microorganisms present on said surface.

According to yet another object of the present invention, there is provided a method of sanitizing a hard surface, wherein said method comprises the steps of:
providing a composition according to the above;
providing a surface which requires sanitizing; and
applying the composition onto said surface for a duration of time sufficiently long enough to destroy microorganisms present on said surface.

DETAILED DESCRIPTION OF THE INVENTION

The present invention is an aqueous acidic composition for cleaning, sanitizing, and/or disinfecting hard surfaces.

According to a preferred embodiment of the present invention, the composition is a multi-purpose aqueous acid hard surface cleaner, sanitizer, and/or disinfectant. Preferably, these types of cleaners are intended to clean hard surfaces by application of a metered discrete amount of the cleaner, typically by pump or trigger sprayer onto the surface to be cleaned or onto the workpiece, such as a soft cloth or sponge, and then wiping the surface, thus removing contaminants present. According to another preferred embodiment, the composition may be applied by pouring a predetermined amount onto a surface and subsequently removing such with a cloth or the like.

According to an aspect of the present invention, there is provided a composition for cleaning a hard surface comprised of:
an alkanesulfonic acid;
a source of peroxide;
an effective amount of a stabilizer; and water.

According to a preferred embodiment of the present invention, the alkanesulfonic acid is present in an amount ranging from 0.5 to 5 w/w % of the total weight of the composition.

According to a preferred embodiment of the present invention, the source of peroxide is present in an amount ranging from 0.5 to 5 w/w % of the total weight of the composition.

According to a preferred embodiment of the present invention, the stabilizer is present in an amount ranging from 0.05 to 1 w/w % of the total weight of the composition.

According to a preferred embodiment of the present invention, when used for example, in agricultural applications, the content of alkanesulfonic acid and the source of peroxide can have a concentration of up to 20 w/w %. Some farm installations on farms may require, at some point in time, the application of a composition capable of cleaning, disinfecting and or sanitizing large surfaces contaminated with high quantities of microbes or other toxins. In those instances, it may be preferable to use a composition of alkanesulfonic acid and peroxide of 10 w/w/ % or even up to 20 w/w %. Large surfaces treated are typically sprayed with the composition and allowed to drip and drain into a large drain which, if left untreated, may be directed to an external environment with no further treatment. In such cases, it is highly desirable to have a composition which is readily biodegradable. That is to say, the alkanolsulfonic acid and the stabilizers are biodegradable. Therefore, if or when those components migrate into the environment, those will be biodegradable.

Preferably the alkanesulfonic acid is selected from the group consisting of: methanesulfonic acid; ethanesulfonic acid; propanesulfonic acid; butanesulfonic acid; pentanesulfonic acid; hexanesulfonic acid; and combinations thereof.

According to a preferred embodiment of the present invention, the compound comprising a sulfonic acid moiety is methanesulfonic acid (MSA). MSA is a desirable acid to use as it is virtually non-fuming and biodegradable. Hence, once the acid composition has been used it can be rinsed and disposed of in the environment and will not cause any unwanted effects. Moreover, MSA can be used on several types of metallic surfaces including stainless steel on which many food processing operations are carried out without corroding or rusting the surface.

Preferably, the source of peroxide is selected from the group consisting of: hydrogen peroxide; benzoyl peroxide; percarbonates; perborates; persulfates; and combinations thereof. Preferably, the source of peroxide is hydrogen peroxide. Preferably, any cheap source of peroxide should be considered.

According to a preferred embodiment of the present invention, the stabilizer is an alkanolamine.

According to a preferred embodiment of the present invention, the stabilizer is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of C1-C5 linear alkyl and C1-C5 branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

According to a preferred embodiment of the present invention, the alkanolamine is selected from the group consisting of: monoethanolamine; diethanolamine; triethanolamine; and combinations thereof. Preferably, the alkanolamine is monoethanolamine.

According to another preferred embodiment of the present invention, the alkanolamine is diethanolamine.

According to yet another preferred embodiment of the present invention, the alkanolamine is triethanolamine.

According to a preferred embodiment of the present invention, the composition has a pH of less than 3. Preferably, the composition has a pH of less than 2.

According to another preferred embodiment of the present invention, the composition has a pH of less than 1.

According to another aspect of the present invention, there is provided a method of cleaning a hard surface, wherein said method comprises the steps of:
providing a composition according to the above;
providing a surface which requires cleaning; and
applying the composition onto said surface for a duration of time sufficiently long enough to destroy micro-organisms present on said surface.

Preferably, additional additives such as fragrance, dye and the like can be included to provide desirable attributes to the composition.

In the present description, effective amounts are generally those amounts listed as the ranges or levels of ingredients in the descriptions which follow hereto. Unless otherwise stated, amounts listed in percentage ("%'s") are in weight percent of the composition.

Water

According to a preferred embodiment of the present invention, the composition is mainly comprised of water with relatively low levels of active ingredients such as acid and peroxide.

According to a preferred embodiment deionized water is used. According to another preferred embodiment tap water is used. Preferably, the type of water can be selected from the group consisting of: reverse osmosis; deionized; distilled and tap water.

According to a preferred embodiment of the present invention, the composition further comprises at least one surfactant. Preferably, the surfactant can be selected from the group consisting of: anionic; cationic; non-ionic; and amphoteric surfactants. Preferably, the amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from $C_8$ to $C_{16}$. Most preferably, the amido betaine comprising a hydrophobic tail from $C_8$ to $C_{16}$ is cocamidobetaine.

Preferably also, the composition further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate A preferred embodiment can refer to a composition comprising cocamidopropyl betaine and β-Alanine, N-(2-carboxyethyl)-N-dodecyl-, sodium salt (1:1).

According to a preferred embodiment of the present invention, the composition further comprises an amine oxide surfactant. Such surfactants are desirable as they have good foaming properties and can help in the removal of solid contaminants when cleaning; disinfecting; and/or sanitizing hard surfaces.

According to a preferred embodiment of the present invention, a small amount of additives can be incorporated for improving the cleaning performance or aesthetic qualities of the cleaner. Adjuncts for cleaning include additional surfactants, such as those described in Kirk-Othmer, Encyclopedia of Chemical Technology 3rd Ed., Volume 22, pp. 332-432 (Marcel-Dekker, 1983), which are incorporated herein by reference. Aesthetic adjuncts include fragrances, such as those available from Givaudan, IFF, Quest and others, and dyes and pigments which can be solubilized or suspended in the formulation, such as diaminoanthraquinones. The amount of these cleaning and aesthetic additives should remain low and should preferably not consist of more than 1% by weight of the total weight of the composition.

Example 1

According to a preferred embodiment of the present invention, a composition was prepared by admixing water, methanesulfonic acid and hydrogen peroxide to yield a concentration of each component as follows:
Methanesulfonic acid—0.70 w/w %
Hydrogen peroxide—1.00 w/w %
Stabilizer—0.10 w/w %
Water—98.2 w/w %
The pH of the resulting composition was between 1.2 and 1.4. The stabilizer selected for Example 1 was monoethanolamine.

Example 2

According to a preferred embodiment of the present invention, a composition was prepared by admixing water, methanesulfonic acid and hydrogen peroxide to yield a concentration of each component as follows:
Methanesulfonic acid—1.75 w/w %
Hydrogen peroxide—2.50 w/w %
Stabilizer—0.25 w/w %
Water—95.55 w/w %
The pH of the resulting composition was below 1. The stabilizer selected for Example 1 was monoethanolamine.

Example 3

According to a preferred embodiment of the present invention, a composition was prepared by admixing water, methanesulfonic acid and hydrogen peroxide to yield a concentration of each component as follows:
Methanesulfonic acid—3.50 w/w %
Hydrogen peroxide—5.00 w/w %
Stabilizer—0.50 w/w %
Water—91.0 w/w %
The pH of the resulting composition was approximately 0.5. The stabilizer selected for Example 1 was monoethanolamine.

US DOT Testing for Stainless Steel Compatibility

Each one of the compositions of Example 1, 2 and 3 were exposed to stainless steel to show their compatibility therewith in accordance with the United States Department of Transportation (US DOT) testing for stainless steel compatibility. The compositions of Examples 1, 2, and 3 were placed in contact with stainless steel for a duration of 7 days at a temperature of 55° C. The results of the corrosion testing are found in Table 1.

TABLE 1

Corrosion testing of Stainless Steel (316SS) for compositions according to preferred embodiment of the present invention at 55° C. for 7 days

| Composition | Corrosion rate | |
| --- | --- | --- |
| | mm/year | lb/ft$^2$ |
| Example 1 | 0.000 | 0.000 |
| Example 2 | 0.000 | 0.000 |
| Example 3 | 0.000 | 0.000 |

Based on the data of Table 1, the compositions of Examples 1, 2, and 3 all met the criteria for passing the test requirement of the US DOT stainless steel compatibility test.

Stability Testing

The inventors have titrated the compositions of Examples 1, 2, and 3. The compositions were stored covered, but not sealed, in a water bath at a constant temperature of 30° C. The peroxide content in this type of composition is an indicator of the stability of the composition. To determine the concentration of $H_2O_2$, the compositions were titrated against a standardized $KMnO_4$ solution. The moles of $H_2O_2$ found in the titrated sample and the moles of $H_2O_2$ used in the preparation of the composition are used to calculate the percent yield. The results of the titration are found in Table 2 below.

TABLE 2

Titration results of compositions of Examples 1, 2 and 3 over time

| | Initial H2O2 (%) | H2O2 (%) after 5 days | H2O2 (%) after 19 days |
| --- | --- | --- | --- |
| Example 1 | 1.23 | 1.23 | 1.18 |
| Example 2 | 3.02 | 2.8 | 2.95 |
| Example 3 | 5.87 | 5.86 | 5.7 |

NB: The presence of oxidizing species such as peroxomonosulfonic acid could account for the readings of higher than the peroxide content initially inputted in the composition, i.e. 1, 2.5 and 5%.

The titration shows that the compositions according to preferred embodiments of the present invention have displayed excellent peroxide stability over time. This has several beneficial effects including: the ability to provide a product which has a significantly longer shelf life; increasing operational efficiency and supply chain management; and minimizing the waste resulting from expired product.

Efficacy Studies for Virucidal and Germicidal Potency for a Read-to-Use Spray Composition According to the Present Invention The composition according to a preferred embodiment of the present invention which was used in the germicidal and virucidal testing (below) comprises the following:
2.75% methanesulfonic acid (MSA);
0.275% monoethanolamine (MEA);
5.25% hydrogen peroxide ($H_2O_2$); and
91.725% water.
In the certificates of analysis collected for each composition, the percentage of hydrogen peroxide is lower than the stated target of 5.25% (varied between 4.82 to 4.99%). This is because the efficacy testing is performed on samples at the Lower Active Ingredient Limit, which is 95% of the target % in the formulation.

TABLE #3

CERTIFICATE OF ANALYSIS - Product surface disinfectant Batches LAB222-20, LAB223-20, and LAB224-20

| Attribute | Method | Specification | Composition Lot#LAB222-20 Result | Composition Lot#LAB223-20 Result | Composition Lot#LAB224-20 Result |
| --- | --- | --- | --- | --- | --- |
| Specific Gravity (20° C.) | Oscillating U-tube | 1.020 to 1.040 | 1.028 | 1.029 | 1.029 |
| Refractive Index | Refractometer | 1.3378 to 1.3408 | 1.3392 | 1.3392 | 1.3392 |
| pH | Electrometric | 0.00 to 2.00 | 0.88 | 0.84 | 0.81 |
| Hydrogen Peroxide Concentration | Titration | (4.99 to 5.78) wt % | 4.82 | 4.83 | 4.83 |

Study #1—Evaluation of the Germicidal Efficacy of a Composition According to a Preferred Embodiment The objective of this study was to evaluate the germicidal efficacy potential of a spray composition according to a preferred embodiment. It measures the potential of the test composition to disinfect hard surfaces contaminated with bacteria. The test follows Official Methods of Analysis (Revised 2013), AOAC 961.02 Germicidal Spray Products as Disinfectants.

It follows the Germicidal Spray Products (GSPT) methodology used to determine the efficacy of disinfectants against two organisms, *Staphylococcus aureus* and *Salmonella enterica*, on hard surfaces based on AOAC methods 961.02 (Germicidal Spray Products as Disinfectants).

Three lots of the test composition, at lower certified limit were evaluated. A total of sixty replicates per microorganism per lot of test agent were evaluated using *Staphylococcus aureus* and *Salmonella enterica* cultures dried on glass slide carriers. The test composition was sprayed on the inoculated dried carriers, exposed for specified contact time, neutralized and cultured in appropriate growth media. All three batches were tested at a lower certified limit of the active agent per sponsor's specification. Each of the three tests were conducted on different days.

The performance standard for *S. aureus* and *S. enterica* is 0-1 positive carriers out of sixty. To be qualified as effective, the product must pass all tests for all test microbes.

The objective of this study was to evaluate the virucidal efficacy of a t composition according to a preferred embodiment for registration of a product as a virucide. The test procedure was to simulate the way in which the product is intended to be used. This method is in compliance with the requirements of and may be submitted to the U.S. Environmental Protection Agency (EPA) and Health Canada,

Test System

The Chat strain of Poliovirus type 1 used for this study was obtained from the American Type Culture Collection, Manassas, VA (ATCC VR-1562). The stock virus was prepared by collecting the supernatant culture fluid from 75-100% infected culture cells. The cells were disrupted and cell debris removed by centrifugation at approximately 2000 RPM for five minutes at approximately 4° C. The supernatant was removed, aliquoted, and the high titer stock virus was stored at s;-?0° C. until the day of use. On the day of use, an aliquot of stock virus (Accuratus Lab Services Lot PC2-43) was removed, thawed and maintained at a refrigerated temperature until used in the assay. The stock virus culture was adjusted to contain 1% fetal bovine serum as the organic soil load. The stock virus tested demonstrated cytopathic effects (CPE) typical of Poliovirus on Vero cells.

Indicator Cell Cultures

Cultures of Vero cells were originally obtained from the American Type Culture Collection, Manassas, VA (ATCC CCL-81). The cells were propagated by Analytical Lab Group-Midwest personnel. The cells were seeded into multiwell cell culture plates and maintained at 36-38° C. in a humidified atmosphere of 5-7% CO2. On the day of testing, the cells were observed as having proper cell integrity and confluency, and therefore, were acceptable for use in this study.

Test Method—Preparation of Test Substance

Three lots of a composition according to a preferred embodiment of the present invention (Lot #LAB222-20, Lot# LAB223-20 and Lot#LAB224-20), as a ready to use trigger spray composition, were used. Spray bottles were provided by Analytical Lab Group-Midwest. The test substance was in solution as dote, mined by visual observation. The test substance was at the exposure temperature prior to use.

Treatment of Virus Films with the Test Substance

For each lot of test substance, five dried virus films were individually exposed for 5 minutes at room temperature (22.0° C.) and 21.68% relative humidity to the amount of spray released under use conditions. The carriers were sprayed with 3 sprays, until thoroughly wet, at a distance of 6-8 inches and held covered for the exposure time. The virus films were completely covered with the test substance. Just prior to the end of the exposure time, the plates were individually scraped with a cell scraper to resuspend the contents and at the end of the exposure time the virus-test substance mixtures were immediately passed through individual Sephadex columns utilizing the syringe plungers in order to detoxify the mixtures. The filtrates ($10^{-1}$ dilution) were then titered by 10-fold serial dilution. To aid in the removal of the cytotoxic effects to the cell cultures the $10^{-2}$ dilutions were passed through one additional Sephadex column following titration, then all dilutions were assayed for infectivity and/or cytotoxicity.

Study Acceptance Criteria—U.S. EPA and Health Canada Submission

A valid test requires 1) that at least 4.8 log10 of infectivity per carrier be recovered from the dried virus control film; 2)

that a log ≥3 $\log_{10}$ reduction in titer must be demonstrated; 3) if cytotoxicity is evident, at least a 3 $\log_{10}$ reduction in titer must be demonstrated beyond the cytotoxic level. Similarly, the log reduction will also take into consideration the level of neutralization; 4) that the cell controls be negative for infectivity. An efficacious product does not need to demonstrate complete inactivation at all dilutions.

Study Results

The titer of the input virus control was 7.50 $\log_{10}/100$ μL. The titer of the dried virus control carriers were 4.50 $\log_{10}/100$ μL (4.80 $\log_{10}$/carrier) for Replicate #1, 4.50 $\log_{10}/100$ μL (4.80 $\log_{10}$/carrier) for Replicate #2, 5.50 log10/100 μL (5.80 log10/carrier) for Replicate #3; 5.25 $\log_{10}/100$ μL (5.55 $\log_{10}$/carrier) for Replicate #4, and 4.50 $\log_{10}/100$ μL (4.80 $\log_{10}$/carrier) for Replicate #5. The average titer of the five dried virus control replicates was 5.07 $\log_{10}/100$ μL (5.37 $\log_{10}$/carrier). The average titer was used to calculate the log reduction in viral titer of each of the test carriers. All cell controls were negative for test virus infectivity.

Test substance cytotoxicity was observed in all three lots at 1.5 $\log_{10}$. The neutralization control (non-virucidal level of the test substance) indicates that the test substance was neutralized at ≤1.5 $\log_{10}$ reduction for all three lots. Taking the cytotoxicity and neutralization control results into consideration, the log reduction in viral titer was a ≥3.57 $\log_{10}$ reduction per volume inoculated per well and per carrier, for each test carrier, for each of the three lots assayed.

Study Conclusion

Under the conditions of this investigation and in the presence of a 1% fetal bovine serum organic soil load, composition according to a preferred embodiment of the present invention, a ready to use trigger spray, demonstrated a ≥3 $\log_{10}$ reduction in titer of Poliovirus type 1 following a 5 minute exposure time at room temperature (22.0° C.) and 21.68% relative humidity as required by the U.S. EPA and Health Canada.

Study #2—Evaluation of the Germicidal Efficacy of a Composition According to a Preferred Embodiment The objective of this study was to evaluate the germicidal efficacy potential of a spray composition according to a preferred embodiment. It measures the potential of the test agent to disinfect hard surfaces contaminated with bacteria. The test follows Official Methods of Analysis (Revised 2013), AOAC 961.02 Germicidal Spray Products as Disinfectants.

Procedure

New ATCC stock cultures were initiated from cultures of *Staphylococcus aureus* (ATCC 6538) and *Salmonella enterica* (ATCC 10708) cultures were inoculated into a tube containing 5-6 mL of TSB for S. aureus and 5-6 mL of NB for *S. enterica*. A loopful of each culture was streaked on TSA plates. Broth and agar plates were incubated at 36±1° C. for 24±2 h. All manipulations were recorded on the In addition, for *S. aureus* a loopful was streaked onto both selective media (MSA and Cetrimide) while for *S. enterica*, a loopful was streaked onto XLD. All plates were incubated at 36±1° C. for 24±2 h.

Following incubation, a sterile spreader was used to inoculate a sufficient number of TSA plates with 100 μL each of the 24±2 h culture. Plates were incubated at 36±1° C. for 24±2 h. For QC purposes, a streak isolation of the 24±2 h broth culture was performed on a TSA plate. In addition, for *S. aureus* a loopful was streaked onto both selective media (MSA and Cetrimide); for *S. enterica*, a loopful was streaked onto XLD. All plates were incubated at 36±1° C. for 24±2 h.

Following incubation, 5 mL cryoprotectant solution (TSB with 15% v/v glycerol for *S. aureus* and NB with 15% v/v glycerol for *S. enterica*) was added to the surface of each agar plate. The cells were suspended using a sterile swab and aspirated from the surface of the agar. The suspension was transferred into a sterile vessel. Process was repeated by adding another 5 mL of cryoprotectant to the agar plates, re-suspending the cells, aspirating the suspension and pooling with the initial cell suspension.

For QC purposes, the pooled suspension was used to perform a streak isolation on a TSA plate. In addition, for *S. aureus*, a loopful was streaked onto both selective media (MSA and Cetrimide); for *S. enterica*, a loopful was streaked onto XLD. All plates were incubated at 36±1° C. for 24±2 hours. The pooled contents of the vessel were mixed thoroughly and dispensed approximately 0.5 to 1.0 mL aliquots into cryovials (e.g., 1.5 mL cryovials).

The cryovials were stored at −70° C. or below; these are the frozen stock cultures. Stock cultures may be used up to 18 months. These cultures are single-use only. Following the incubation period, the colony morphology on TSA and selective media plates (including the absence of growth, Gram stain and other biochemical reactions were recorded on the Test Microbe Confirmation Sheet (Quality Control).

Carrier Preparation

Carriers were visually screened. Scratched, chipped or nicked carriers were discarded. Carriers were washed with water. Ethyl alcohol was added, decanted and the carriers were rinsed three times with deionized water to remove oil and film on the slides. Cleaned carriers were placed in glass petri dishes matted with 2 pieces of 9 cm filter paper. Carriers were steam-sterilized, cooled and stored at room temperature until use.

For *S. aureus* and *S. enterica*: using a vortex-style mixer, 48-54 h test cultures were mixed for 3-4 s and let stand 5 minutes at room temperature before continuing.

Each carrier was inoculated with 0.01 ml of the test culture and was spread onto approximately 1 sq. in. of the sterile test carrier in the petri dish and was not allowed to contact the edge of the glass slide carriers. The carriers were dried in an incubator for 30-40 min at 36±1° C. Time was recorded. Efficacy test was performed within 2 hours of drying. The following conditions were strictly observed: carriers which were not thoroughly dry were not inoculated; and any inoculated carrier which was wet at the end of drying period was not used in testing.

Test Agent Preparation

The test agent was ready to use. The test sample was dispensed in sterile spray bottle which was placed in a water bath and allowed to come to specified test temperature for at least ten minutes before testing. Contact time, temperature, and neutralizer was recorded on the Test Information Sheet.

Test

After the required carrier drying time, the slides were sprayed sequentially for a specified time, distance, and number of pumps at timed intervals with the carriers in a horizontal position. A certified timer was used to time the spray interval.

After the last slide of a set (20 slides) had been sprayed with the disinfectant and the exposure time was complete, slides were sequentially transferred into the primary subculture tube containing the appropriate neutralizer within the ±5 second time limit. The excess disinfectant from each slide was drained prior to transfer into the neutralizer tube.

After the slides were placed in the subculture tubes, the subculture tube was capped, mixed thoroughly and incubated at 36±1° C. for 48±2 h. Secondary subculture tube was not needed since the neutralizer effectiveness test results which was done prior to the efficacy test passed at primary culture tube. Change in turbidity to the medium was used to assess the results as a positive or negative outcome. Further analysis, including biochemical reactions and API tests, were performed in order to confirm the positive and negative outcomes.

Product Evaluation Criteria

According to the EPA, the test agent passes the test if visible growth is observed in no more than (0-1/60) of the subculture broths per organism for any lot of the test agent and the controls meet their stipulated criteria. If product passes the performance standard, a minimum of 20% of the negative tubes will be cultured on TSA plates to confirm the absence of the test organism. Negative tubes will be continued to incubate for additional 24 hours to confirm the negative results. The performance standard for S. aureus and S. enterica is 0-1 positive carriers out of sixty.

TABLE 4

Disinfectant Efficacy Test Results against Staphylococcus aureus ATCC 6538 after a 5 minute exposure

| Sample Id/Lot# | Challenge Organism | # of treated carriers | # of growing treated carriers | Growth Results |
|---|---|---|---|---|
| Composition Lot # Lab123- | S. aureus ATCC # 6538 | 60 | 0 | 0/60 |
| Composition Lot # Lab124- | S. aureus ATCC # 6538 | 60 | 0 | 0/60 |
| Composition Lot # Lab125- | S. aureus ATCC # 6538 | 60 | 0 | 0/60 |

TABLE 5

Disinfectant Efficacy Test Results against Salmonella enterica ATCC 10708 after a 5 minute exposure

| Sample Id/ Lot# | Challenge Organism | # of treated carriers | # of growing treated carriers | Growth Results |
|---|---|---|---|---|
| Composition Lot # Lab123- | Salmonella enterica ATCC # 10708 | 60 | 0 | 0/60 |
| Composition Lot # Lab124- | Salmonella enterica ATCC # 10708 | 60 | 0 | 0/60 |
| Composition Lot # Lab125- | Salmonella enterica ATCC # 10708 | 60 | 0 | 0/60 |

Results

Three lots of the test agent, at lower certified limit were evaluated. A total of sixty replicates per microorganism per lot of test agent were evaluated using Staphylococcus aureus and Salmonella enterica cultures dried on glass slide carriers. The test agent was sprayed on the inoculated dried carriers, exposed for specified contact time, neutralized and cultured in appropriate growth media. All three batches were tested at a lower certified limit of the active agent per sponsor's specification. Each of the three tests were conducted on different days. The performance standard for S. aureus and S. enterica is 0-1 positive carriers out of sixty. To be qualified as effective, the product must pass all tests for all test microbes. The tests confirm that the test agent effectively kills Staphylococcus aureus as well as Salmonella enterica. Therefore, the product does meet the performance requirements for disinfectant efficacy claims against Staphylococcus aureus and Salmonella enterica at 5 minutes of contact time at lower certified limit of test agent tested.

Study #3—Evaluation of the germicidal Efficacy of a Composition According to a Preferred Embodiment The objective of this study was to determine the effectiveness of the product as a disinfectant for hard surfaces following the AOAC Use-Dilution Method. This method is in compliance with the requirements of the U.S. Environmental Protection Agency (EPA) and Health Canada.

Study Materials

The test organism(s) used in this study was obtained from the American Type Culture Collection (ATCC), Manassas, VA.

Exposure Conditions

Each contaminated and dried carrier was placed into a separate tube containing 10.0 ml of the test substance. Immediately after placing each test carrier in the test tube, the tube was swirled using approximately 2-3 gentle rotations to release any air bubbles trapped in or on the carrier. The carriers were exposed for 5 minutes at 20.0° C. Care was taken to avoid touching the sides of the tubes. The carrier was placed into the test substance within ±5 seconds of the exposure time following a calibrated timer.

Study Acceptance Criteria

Test Substance Performance Criteria

For Pseudomonas aeruginosa, the efficacy performance requirements for label claims state that the test substance must kill the microorganism on 54 out of the 60 inoculated carriers. The tests were performed with study control which performed according to specific criteria.

Analysis

Surface Disinfectant product (Batch LAB222-20), ready to use, demonstrated no growth of Pseudomonas aeruginosa (ATCC 15442) in any of the 60 subculture tubes following a 5 minute exposure time at 20±1° C. (20.0° C.). Surface Disinfectant product (Batch LAB223-20), ready to use, demonstrated no growth of Pseudomonas aeruginosa (ATCC 15442) in any of the 60 subculture tubes following a 5 minute exposure time at 20±1° C. (20.0° C.) Surface Disinfectant product (Batch LAB224-20), ready to use, demonstrated growth of Pseudomonas aeruginosa (ATCC 15442) in one of the 60 subculture tubes following a 5 minute exposure time at 20±1° C. (20.0° C.).

Results

Under the conditions of this investigation, the Surface Disinfectant product according to a preferred embodiment of the present invention in a ready-to-use format, as evaluated on three separate test dates, demonstrated efficacy against *Pseudomonas aeruginosa* as required by the U.S. EPA and Health Canada following a 5 minute exposure time at 20±1° C. (20.0° C.).

Corrosion Testing

Testing Series #1—Corrosion Testing on Various Steels

Summary

Specific corrosion tests for a composition according to a preferred embodiment of the present invention were carried out on 316 SS, 304 SS, 2507 Super Duplex, aluminum A7075 and C26000 Brass coupons for long term corrosion testing. The corrosion tests were executed at 55° C. for 7 days (168 hours) at atmospheric pressure. In each instance, the corrosion rate was observed to be less than 0.200 lb/ft2.

Corrosion Rate Testing

Procedure:

The corrosion tests were executed in a glass sample jar in a heated water bath. For each condition listed in Table 1, the coupon was washed with acetone, air dried, and weighed, before being immersed in the test fluid. The fluid in each glass sample jar was pre-heated up to temperature before exposing the coupon to the acid blend. After the exposure period, the coupon was removed, washed with water, followed by an acetone wash, air dried, and then weighed. The corrosion rate was determined from the weight loss, and the pitting index (from literature) was evaluated visually at 40× magnification, and a photo of the coupon surface at 40× magnification was taken.

TABLE 1

Corrosion test results for testing series #1

| Coupon | Corrosion rate Mm/year | Lb/ft$^2$ | Pitting index |
|---|---|---|---|
| 316SS | 0.004 | 0.0001 | 0 |
| 304SS | 0.002 | 0.0001 | 0 |
| 2507 Super Duplex | 0.001 | 0.00004 | 0 |
| A7075 | 3.832 | 0.042 | 3 |
| C26000 | 5.454 | 0.182 | 4 |

Note:
0 indicates no pits. The surface is the same as for the original untreated coupon
3 indicates scattered, very shallow pinpoint pits, less than 25 pits on either surface - i.e. on front or back
4 indicates more than 25 pits of Pitting Index 3 on either surface Testing series #2—Corrosion Testing on Various Steels Summary Specific corrosion tests for a composition according to a preferred embodiment of the present invention on C26000 Brass and copper coupons for long term corrosion testing. The corrosion tests were executed at different temperatures and times as listed in Table 1. The corrosion rate was observed to be less than 0.150 lb/ft2.

Corrosion Rate Testing Procedure

The corrosion tests were executed in a glass sample jar in a heated water bath. For each condition listed in Table 1, the coupon was washed with acetone, air dried, and weighed, before being immersed in the test fluid. The fluid in each glass sample jar was pre-heated up to temperature before exposing the coupon to the acid blend. After the exposure period, the coupon was removed, washed with water, followed by an acetone wash, air dried, and then weighed. The corrosion rate was determined from the weight loss, and the pitting index (from literature) was evaluated visually at 40× magnification, and a photo of the coupon surface at 40× magnification was taken. The corrosion test conditions are set out in Table 1 and the corrosion test results are set out in Table 2.

TABLE 1

Corrosion test conditions

| Coupon type | Temperature (° C.) | (° F.) | Pressure (psi) | Duration (hrs) |
|---|---|---|---|---|
| C26000 | 30 | 86 | 0 | 24 |
| Copper | 30 | 86 | 0 | 24 |
| Copper | 60 | 140 | 0 | 1 |
| Copper | 60 | 140 | 0 | 0.5 |

TABLE 2

Corrosion test results for testing series #2

| Coupon type | Corrosion Rate Mm/year | Lb/ft$^2$ | Pitting index |
|---|---|---|---|
| C26000 | 27.799 | 0.133 | 2 |
| Copper | 15.161 | 0.076 | 3 |
| Copper | 512.321 | 0.053 | 3 |
| Copper | 329.772 | 0.069 | 3 |

Note:
0 indicates no pits. The surface is the same as for the original untreated coupon
1 indicates intergranular corrosion on the cut edge of the coupon, giving a sintered effect; no pits on major surfaces
2 indicates small, shallow pits on cut edges: no pits on major surfaces
3 indicates scattered, very shallow pinpoint pits, less than 25 pits on either surface - i.e. on front or back The above results indicate that a composition according to a preferred embodiment of the present invention can be used on a variety of metallic surfaces with no little to no damage without the need to resort to a toxic corrosion inhibitor. This is a desirable feature as many metals may need to be treated when performing surface cleaning, disinfection or sanitizing. Thus, a composition which can perform such while reducing or completely avoiding damaging the metallic surfaces it is exposed to and being free of corrosion inhibitors is of high value.

Testing series #3—Corrosion Testing on Various Materials

Summary

Specific corrosion tests for the composition according to a preferred embodiment of the present inveiton was carried out on different materials including fabric of different colors, copper and galvanized steel piping, quartz (Silestone) tiles, granite and laminated wood. The corrosion tests were executed at ambient temperature and following instructions set out in the testing protocol.

On Metals

The corrosion tests were executed following procedure for testing on copper and galvanized steel. The samples were washed with water and acetone, air dried, and weighed before being tested. The testing procedure is as follows: the material was placed in a weighing boat and sprayed 3 times. The composition according to a preferred embodiment of the present invention was left to treat the surface for 5 minutes. Samples were then wiped with a clean, soft cloth. The procedure was repeated 9 more times for a total of 10 applications. After the test, the sample was weighed and the corrosion rate was determined from the weight loss. A photo of the material was taken before and after the testing to compare appearance. The corrosion test results are shown in Table 1 for the testing on copper and galvanized steel pipes.

TABLE 1

Corrosion test results for copper and galvanized steel materials.

| Material | Initial weight (g) | Final Weight (g) | Observations |
| --- | --- | --- | --- |
| Copper pipe | 23.2817 | 23.1283 | Visible corrosion on the pipe. Visible blue liquid observed when MSX-Ultra is spray suggesting corrosion. |
| Galvanized steel pipe | 45.5595 | 45.4509 | No visible corrosion was observed. |

On Fabrics

Two different procedures were tested for fabrics. Procedure #2A: Each fabric was sprayed 3 times. The composition according to a preferred embodiment of the present invention was left to treat the fabric for 5 minutes. Samples were then rinsed with water by placing it underneath a stream of water and allowed to air dry. Procedure #2B: Each fabric was sprayed 3 times and the composition according to a preferred embodiment of the present invention was left on the fabric to air dry. No rinsing was performed. A photo of the material was taken before and after the testing to compare appearance. The test results are shown in Table 2 for the testing on various colored fabrics.

TABLE 2

Corrosion test results on fabrics

| Material | Observation |
| --- | --- |
| Procedure #2A - Rinse | |
| Green fabric | No discoloration or bleaching observed. |
| Dark blue fabric | Slight discoloration was observed |
| Light blue fabric | No discoloration or bleaching observed. |
| Pink fabric | No discoloration or bleaching observed. |
| Purple fabric | No discoloration or bleaching observed. |

TABLE 2-continued

Corrosion test results on fabrics

| Material | Observation |
| --- | --- |
| Procedure #2B - No Rinse | |
| Green fabric | Spots were bleached yellow. |
| Dark blue fabric | Fabric was bleached pink and purple. |
| Light blue fabric | Spots were bleached. |
| Pink fabric | Some bleached spots were observed. |
| Purple fabric | Fabric was bleached light purple. |

Other Materials

Each material was sprayed with the composition 3 times. The composition tested was left to treat the surface for 5 minutes. Samples were then wiped with a clean, soft cloth. The procedure was repeated 9 more times for a total of 10 applications. A photo of the material was taken before and after the testing to compare appearance. The test results are shown in Table 2 for the testing on various materials.

TABLE 3

Corrosion test results on various materials

| Material | Observations |
| --- | --- |
| Quartz tiles | No discoloration or corrosion observed. |
| Granite piece | No discoloration or corrosion observed. |
| Laminated wood | No discoloration or corrosion observed. |

The above results indicate that a composition according to a preferred embodiment of the present invention can be used on a variety of surfaces with no little to no damage and/or discoloration. This is a desirable feature as many surfaces may need to be treated when performing surface cleaning, disinfection or sanitizing. Thus, a product which can perform such while avoiding damaging the surfaces it comes in contact with or materials it is exposed to is of high value.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims.

The invention claimed is:

1. A composition for use as a hard surface cleaner, disinfectant and/or sanitizer, said composition consisting of:
    an alkanesulfonic acid;
    a source of peroxide;
    an effective amount of a stabilizer selected from the group consisting of:
    monoethanolamine; taurine; taurine derivatives, taurolidine; taurocholic acid; tauroselcholic acid; tauromustine; 5-taurinomethyluridine and 5-taurinomethyl-2-thiouridine; homotaurine (tramiprosate); acamprosate; taurates; and aminoalkylsulfonic acids where the alkyl is selected from the group consisting of C1-C5 linear alkyl and C3-C5 branched alkyl; and
    water.

2. The composition according to claim 1, where said alkanesulfonic acid is present in an amount ranging from 0.5 to 5 w/w % of the total weight of the composition.

3. The composition according to claim 1, where said source of peroxide is present in an amount ranging from 0.5 to 10 w/w % of the total weight of the composition.

4. The composition according to claim 1, where said stabilizer is present in an amount ranging from 0.05 to 5 w/w % of the total weight of the composition.

5. The composition according to claim 1, where said alkanesulfonic acid is selected from the group consisting of: alkanesulfonic acids where the alkyl groups range from C1-C6 and are linear or branched; and combinations thereof.

6. The composition according to claim 1, where said alkanesulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof.

7. The composition according to claim 1 where said alkanesulfonic acid is methanesulfonic acid.

8. The composition according to claim 1 where said alkanesulfonic acid has a molecular weight below 300 g/mol, preferably said alkanesulfonic acid has a molecular weight below 150 g/mol.

9. The composition according to claim 1, where said source of peroxide is selected from the group consisting of: hydrogen peroxide; benzoyl peroxide; percarbonates; perborates; persulfates; and combinations thereof.

10. The composition according to claim 1 wherein said source of peroxide is hydrogen peroxide.

11. The composition according to claim 1, where the stabilizer is an alkanolamine.

12. The composition according to claim 1, where the composition has a pH of less than 3.

13. The composition according to claim 1, where the composition has a pH of less than 2.

14. The composition according to claim 1, where the composition has a pH of less than 1.

15. Method of disinfecting a hard surface, wherein said method comprises the steps of:
    providing a composition according to claim 1;
    providing a surface which requires disinfecting; and
    applying the composition onto said surface for a duration of time sufficiently long enough to destroy microorganisms present on said surface.

16. Method of sanitizing a hard surface, wherein said method comprises the steps of:
    providing a composition according to claim 1;
    providing a surface which requires sanitizing; and
    applying the composition onto said surface for a duration of time sufficiently long enough to destroy microorganisms present on said surface.

17. A composition for use as a hard surface cleaner, disinfectant and/or sanitizer, said composition consisting of:
    an alkanesulfonic acid selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof;
    a source of peroxide;
    an effective amount of a stabilizer; and
    water.

* * * * *